US008145134B2

(12) United States Patent
Henry et al.
(10) Patent No.: US 8,145,134 B2
(45) Date of Patent: Mar. 27, 2012

(54) WIRELESS MICROPHONE BEACON

(75) Inventors: Paul Shala Henry, Holmdel, NJ (US); Herbert Andrew Harms, Great Bend, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 604 days.

(21) Appl. No.: 12/337,382

(22) Filed: Dec. 17, 2008

(65) Prior Publication Data

US 2010/0022205 A1 Jan. 28, 2010

Related U.S. Application Data

(60) Provisional application No. 61/135,586, filed on Jul. 22, 2008.

(51) Int. Cl.
*H04B 1/00* (2006.01)

(52) U.S. Cl. ........................ 455/63.1; 455/67.13; 455/62

(58) Field of Classification Search ................. 455/63.1, 455/67.13, 67.11, 63.2, 62
See application file for complete search history.

(56) References Cited

U.S. PATENT DOCUMENTS 4,107,613 A 8/1978 Queen et al.
5,745,075 A 4/1998 Enge et al.
6,246,864 B1 6/2001 Koike
6,377,608 B1 * 4/2002 Zyren ........................... 375/132
6,671,503 B1 12/2003 Niwamoto
7,903,599 B1 * 3/2011 Talley et al. .................. 370/318
2005/0058117 A1 * 3/2005 Morioka et al. .............. 370/346
2006/0030362 A1 2/2006 Fukuda
2007/0025567 A1 2/2007 Fehr
2007/0105574 A1 * 5/2007 Gupta et al. .................. 455/509
2007/0211680 A1 9/2007 Laroia et al.
2008/0043863 A1 * 2/2008 Ji et al. ........................... 375/260
2009/0316529 A1 * 12/2009 Huuskonen et al. .......... 367/124
2010/0291880 A1 * 11/2010 Feldstein ........................ 455/73

* cited by examiner

*Primary Examiner* — Peguy Jean Pierre

(57) ABSTRACT

Disclosed is a method and system for a radio beacon to protect wireless microphones from interference. One embodiment involves providing each wireless microphone system with a signal detector that detects interfering signals and a 'beacon' transmitter that sends a multitone beacon signal. Users that transmit on a potentially interfering frequency employ a beacon detector that 'listens' for the beacon signal. The users inhibit transmission if such a signal is detected.

27 Claims, 10 Drawing Sheets

WIRELESS MICROPHONE BEACON

This application claims the benefit of U.S. Provisional Application No. 61/135,586 filed on Jul. 22, 2008, which is incorporated herein by reference.

BACKGROUND

The use of radio frequencies is controlled by national and international bodies and such frequencies generally cannot be used without licenses from the appropriate governing bodies that control various specific uses of those frequencies. To avoid interference with licensed frequencies, these governing bodies often do not license portions of the spectrum adjacent to areas that are licensed. The term "white space" is used to refer to these unused radio frequencies within the electromagnetic spectrum.

White space may also exist simply as a result of radio frequencies that have never been, or are no longer being, licensed or used. As an example, the FCC's planned change to digital television may create large areas of white space. On Nov. 4, 2008, the FCC voted to permit use of certain white space frequencies without licenses. (See "FCC White Spaces Decision Kicks Off the Next Wireless Revolution", Nov. 5, 2008, http://blog.wired.com/gadgets/whitespaces/index.html, retrieved on Dec. 8, 2008).

The availability of free, unregulated spectrum could create new technologies and new markets for bringing fast wireless internet connectivity to the masses. However, wireless microphones and other equipment used by broadcasters, theater producers, schools and houses of worship already use some of this spectrum. These groups of wireless microphone users have expressed concern that the unlicensed and unregulated use of certain regions of the radio frequency spectrum may be a source of interference with their wireless microphones.

SUMMARY

The technology disclosed in this specification relates to a method and apparatus to protect wireless microphones (which are widely used in broadcasting, theaters, schools and churches) from interference caused, for example, by unlicensed users. Such protection is useful because the FCC is expected to issue regulations that will encourage widespread unlicensed use of certain frequencies, previously used by television channels, that are also used by wireless microphones. These unused television channels are called the TV white spaces. Disclosed is a method and apparatus that involves a protective beacon for white space operation of wireless microphones.

In an environment where white space users are given shared access to spectrum (e.g. certain unused TV channels) formerly occupied solely by wireless microphones, the incumbent microphone systems will become exposed to potential interference caused by the newly allowed white space devices, unless special protective measures are employed. One technique involves providing each wireless microphone with a 'beacon' transmitter that will send out an easily recognizable signal. Every user that may transmit on a white space frequency would be required to employ a beacon detector that would 'listen' for a beacon's signal, and would inhibit transmission if such a signal were detected.

DETAILED DESCRIPTION

Wireless microphone systems are widely used in broadcasting, theaters, schools and houses of worship. Users of wireless microphones face a key issue related to the FCC's proposal for the unlicensed use of the spectrum that will be unused due to the forthcoming 2009 digital TV transition. The FCC has issued regulations that encourage future widespread unlicensed use of certain television channel frequencies that are already used by the wireless microphone systems. These FCC regulations will expose the wireless microphone systems to potential interference caused by the newly allowed users of the freed spectrum. (See FCC 08-260, Federal Communications Commission Second Report and Order and Memorandum Opinion and Order, Nov. 14, 2008, http://hraunfoss.fcc.gov/edocs_public/attachmatch/FCC-08-260A1.pdf, retrieved on Dec. 15, 2008).

Figure 1:
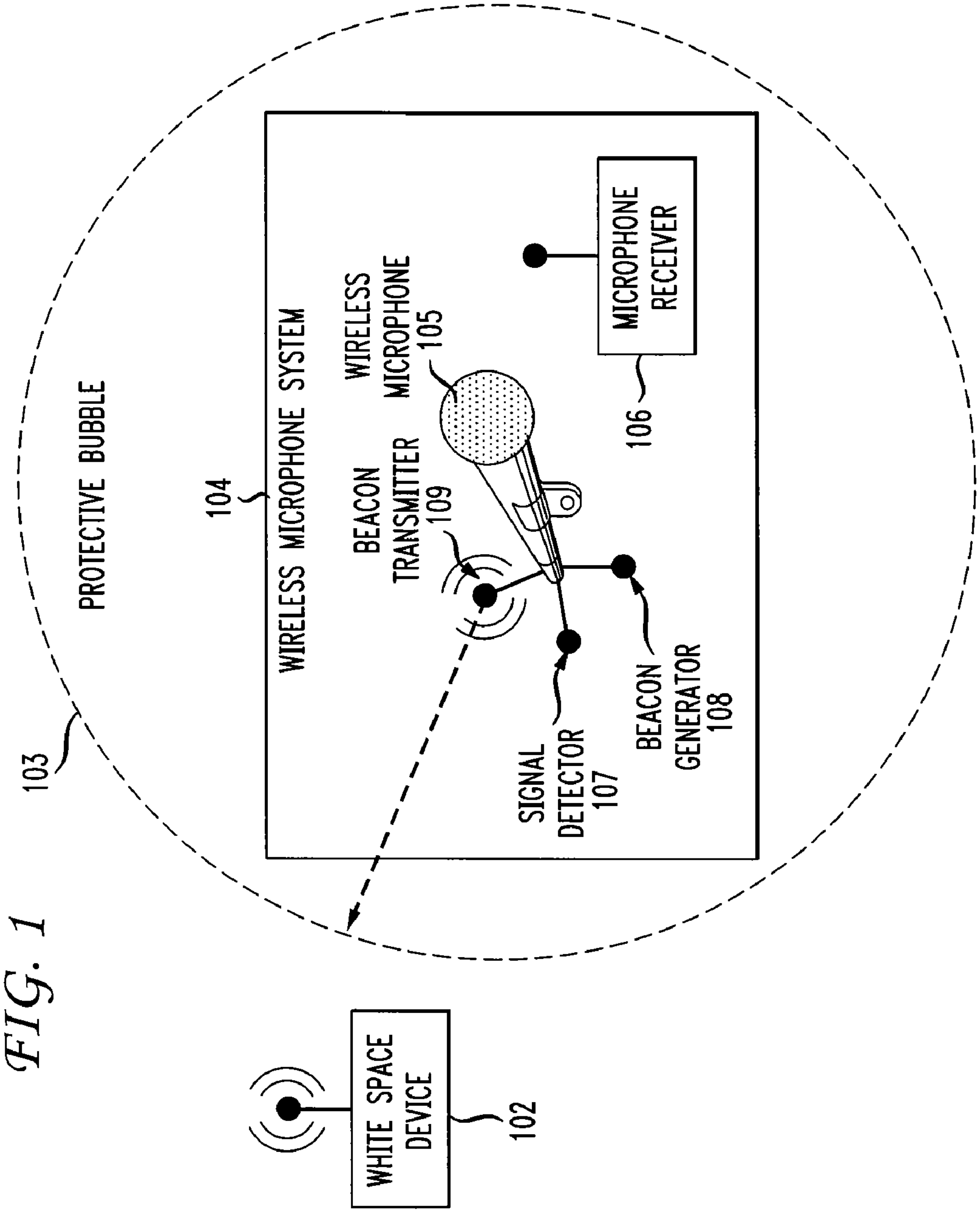
FIG. 1 is a diagram of a wireless microphone beacon.
Figure 1A:
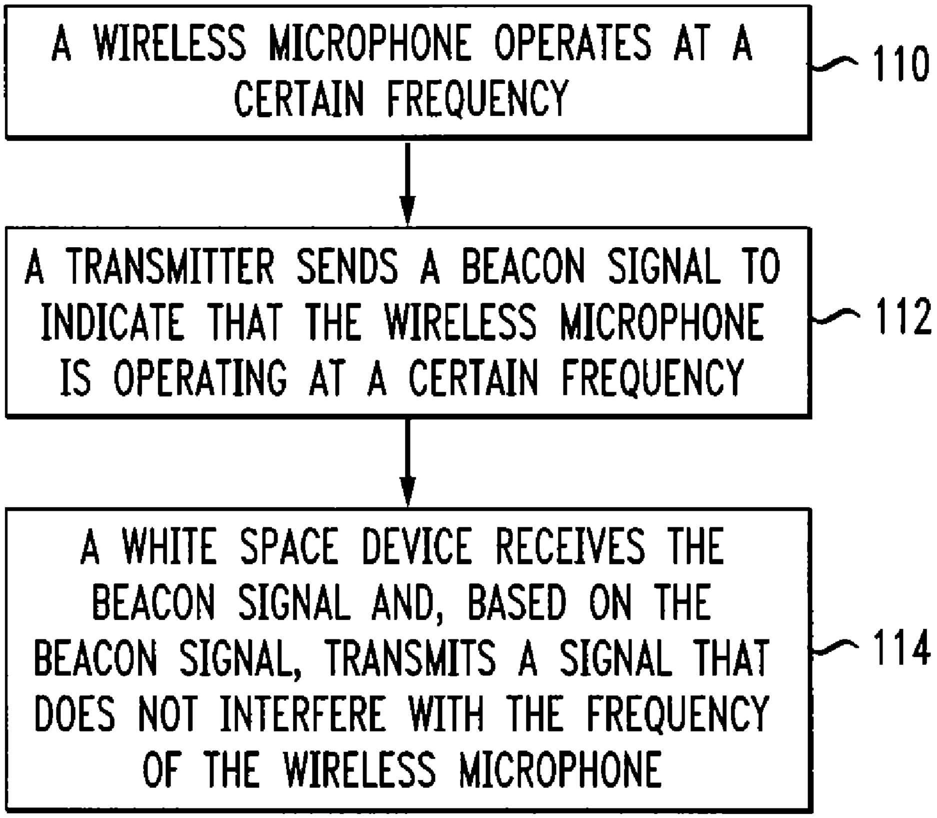
FIGS. 1A and 1B are flow charts depicting implementations of the wireless microphone beacon.

FIG. 1 depicts a wireless microphone beacon in accordance with embodiments of the technology disclosed in this specification. FIG. 1A is a flow chart showing the steps performed in accordance with one embodiment of the technology described herein. FIGS. 1 and 1A are discussed together in describing a method and apparatus for protecting a wireless microphone system from interference from a white space device.

As shown in FIG. 1, wireless microphone system, 104, comprises a wireless microphone, 105, and a microphone receiver, 106, that operates at a certain frequency, as described in step 110 of FIG. 1A. The wireless microphone system 104 also includes a signal detector, 107, that detects signals that interfere with the frequency that is used by the wireless microphone 105, a beacon generator, 108, that generates a multi-tone beacon signal, and a beacon transmitter, 109. The signal detector 107, the beacon generator 108 and the beacon transmitter 109 may be co-located with the microphone receiver 106 to minimize the weight and power requirement of the wireless microphone 105. Also, as depicted in FIG. 1, the signal detector 107, the beacon generator 108 and the beacon transmitter 109 may be co-located with the microphone 105. The wireless microphone system, 104, and white space device, 102, are capable of wireless communication in the frequencies now occupied by analog TV signals.

As described in step 112 of FIG. 1A, the wireless microphone system 104 transmits an easily recognized beacon indicating that the wireless microphone system 104 is operating at a certain frequency. In step 114, the beacon signal is received by the white space device 102. Based on its receipt of the beacon signal, the white space device 102 transmits a signal that does not interfere with the frequency that is being used by the wireless microphone system 104. In effect, transmission of the beacon signal results in a protective bubble 103 around the wireless microphone system 104 in which no interfering signals are transmitted by white space device 102.

Figure 1B:
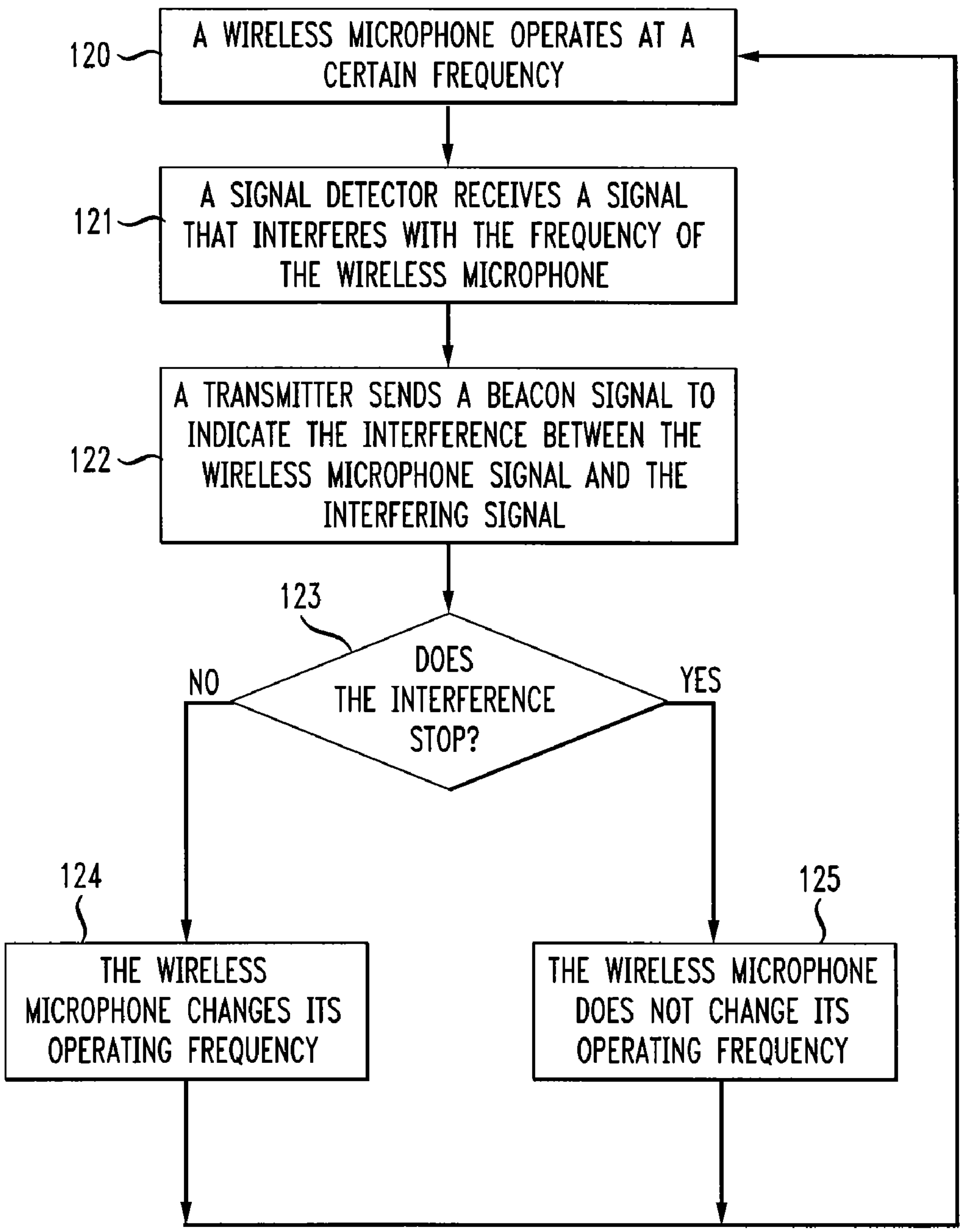

FIG. 1B illustrates a flow chart depicting an embodiment of the technology disclosed in this specification. The wireless microphone system 104, as shown in step 120, operates at a certain frequency. In step 121, a signal detector receives a signal that interferes with the operating frequency of the wireless microphone system 104. In response to the interfering signal, a beacon signal is generated and transmitted in step 122. The existence of the beacon signal indicates that the wireless microphone system 104 has received an interfering signal. Next, the wireless microphone system 104 in decision step 123 determines if the interfering signal is still being received.

If, at decision step 123, the white space device 102 continues to transmit an interfering signal, then at step 124 the wireless microphone system 104 changes its operating frequency to avoid the interfering signal. If, however, at decision step 123 the white space device 102 stopped transmission of the interfering signal, then at step 125 the wireless microphone system 104 does not change its operating frequency because the interfering signal no longer exists. The outputs of steps 124 and 125 revert to step 120, where the wireless microphone system 104 operates at a certain frequency.

Figure 1C:
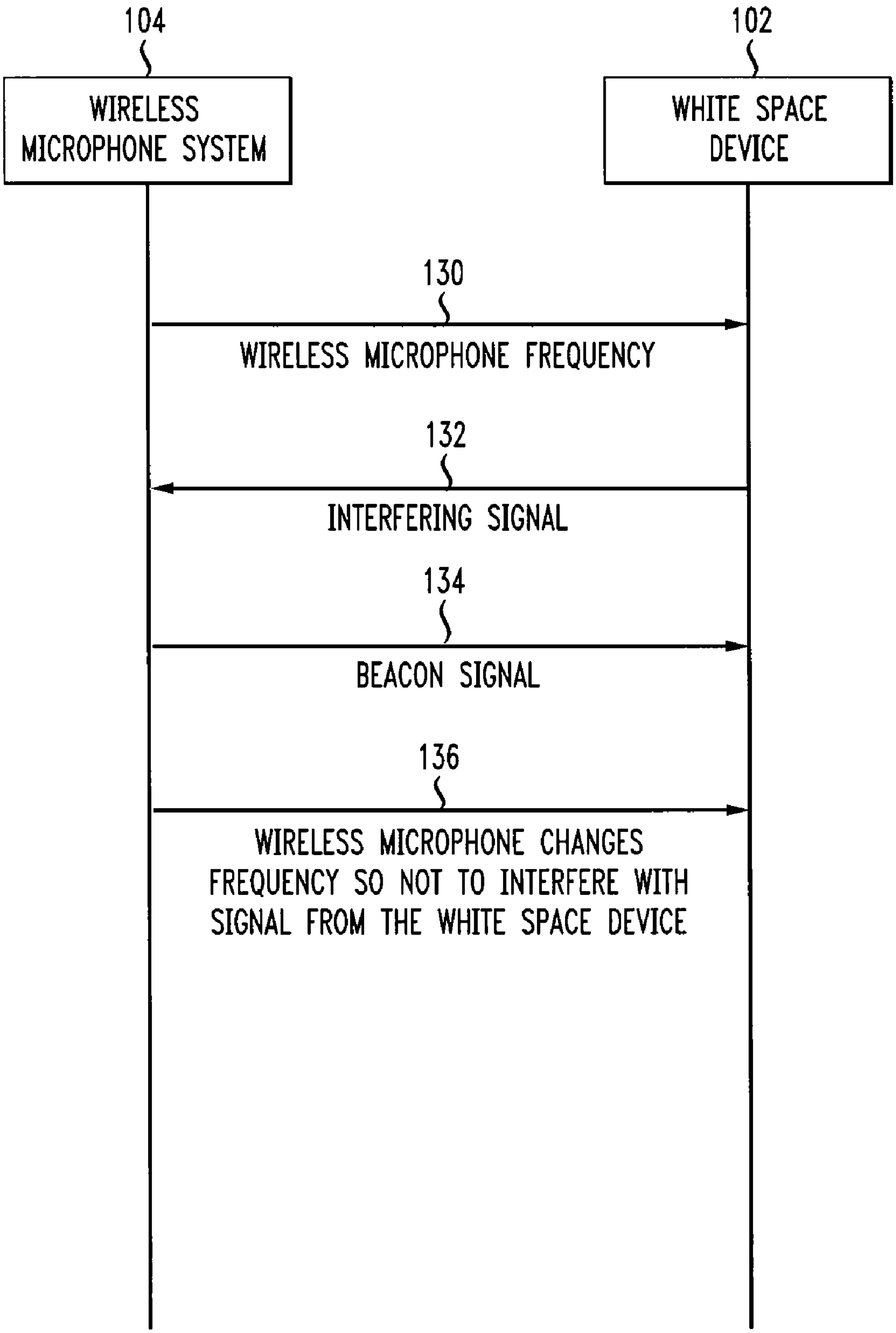
FIGS. 1C, 1D and 1E are frequency transmission diagrams for the wireless microphone system and the white space device.
Figure 1D:
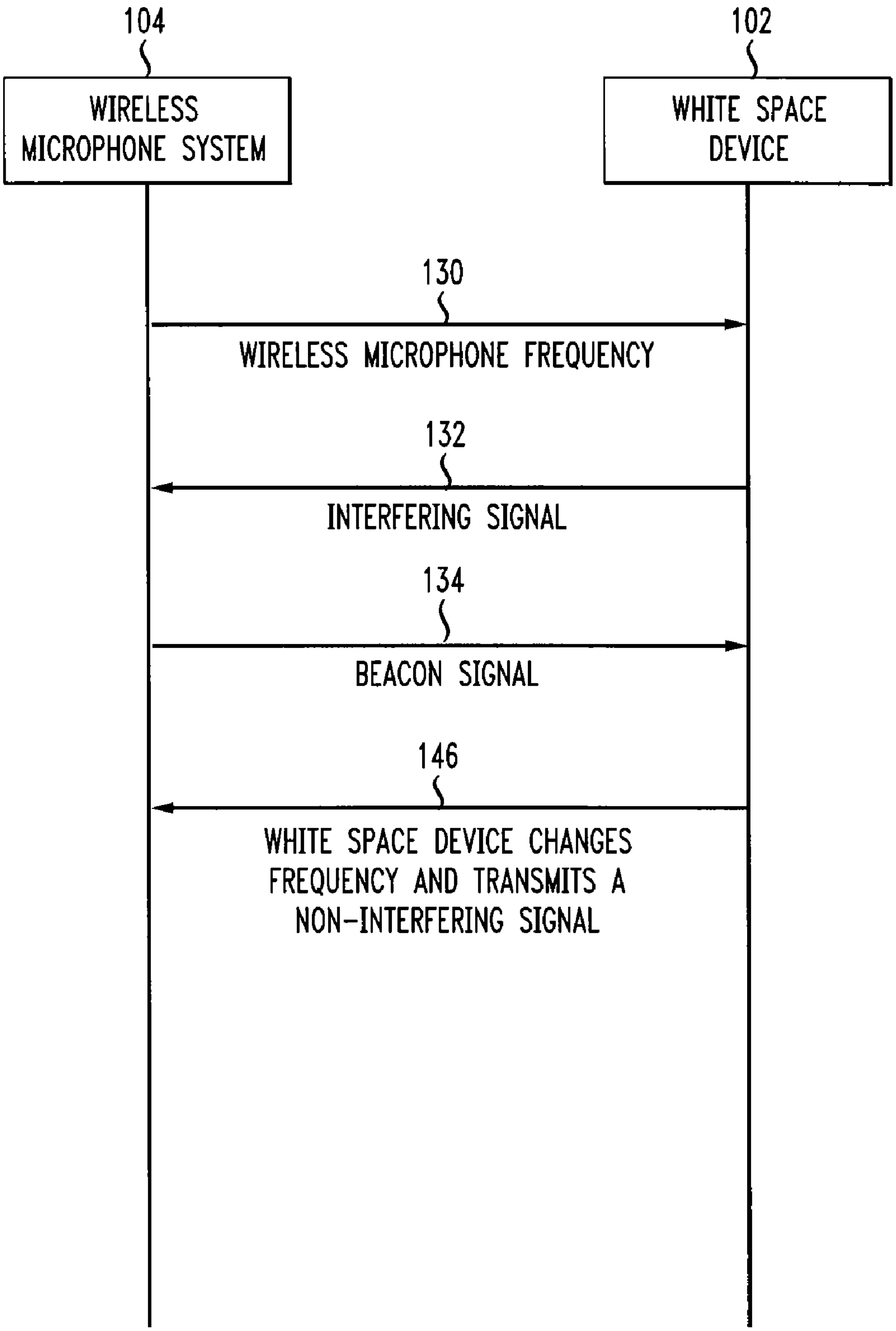
Figure 1E:
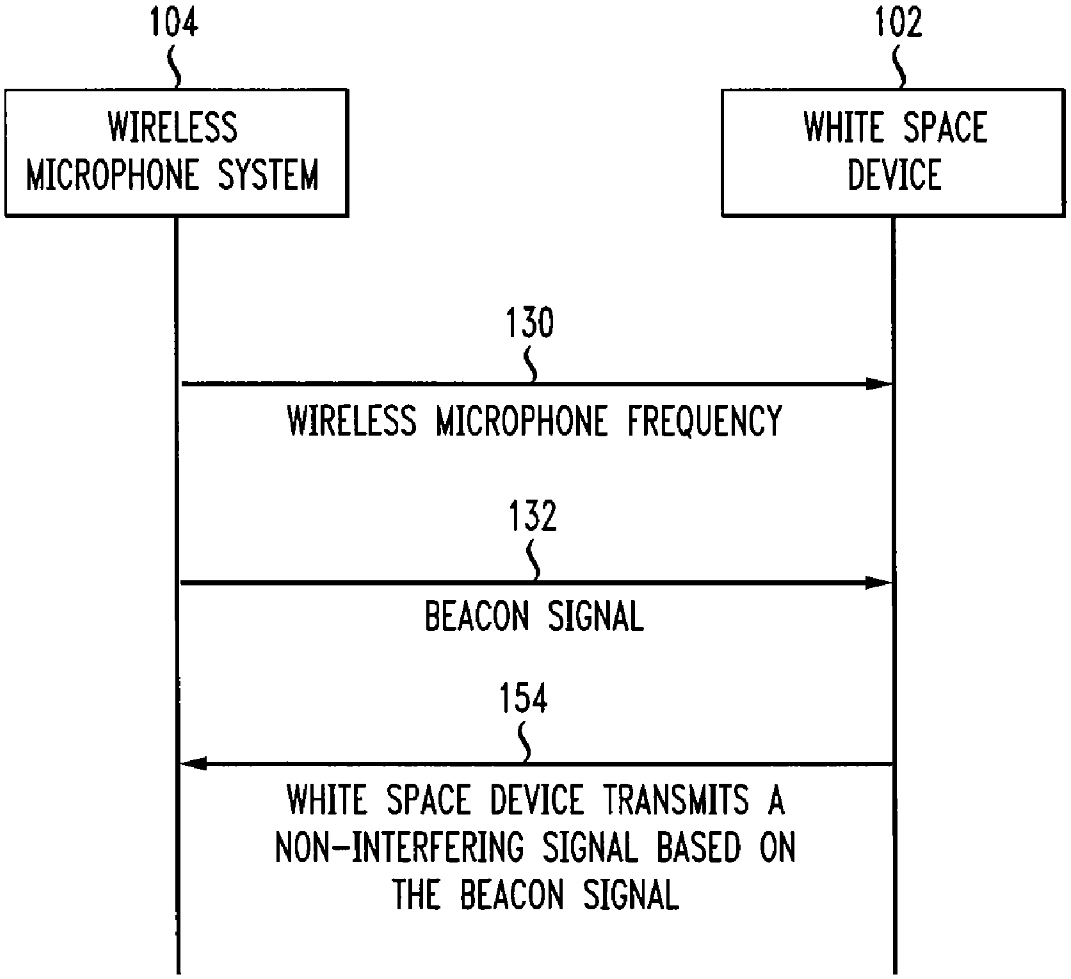

FIGS. 1C, 1D and 1E are frequency transmission diagrams for the wireless microphone system 104 and the white space device 102. FIG. 1C depicts a frequency transmission diagram in accordance to an embodiment of the technology disclosed in the specification. A wireless microphone system 104 is operating at a specific frequency 130. A white space device 102 transmits an interfering signal 132 that is received by the wireless microphone system 104. In response to the interfering signal from the white space device 102, the wireless microphone system 104 transmits a beacon signal 134 indicating the interfering signals. If the interfering signal persists beyond a predetermined duration after the beacon is transmitted, then the wireless microphone system 104 changes frequency so as not to interfere with the signal from the white space device 136. In one embodiment, the predetermined duration will be such that the frequency change will be perceptually seamless to the human ear. For example, if the predetermined duration is one second or longer, then the channel interference would likely be noticeable to a human. If, however, the predetermined duration is one-tenth of a second or less, then the channel interference would likely not be noticeable to a human.

In FIG. 1D, a wireless microphone system 104 is operating at a specific frequency 130. A white space device 102 transmits an interfering signal 132 that is received by the wireless microphone system 104. In response to the interfering signal from the white space device, the wireless microphone system 104 transmits a beacon signal 134 indicating the interfering signals. The white space device 102 changes the frequency of its signal and transmits a non-interfering signal, in response to the beacon signal indicating the interfering signals 146. Thus, the wireless microphone system 104 is protected from interference.

FIG. 1E illustrates an embodiment where the wireless microphone system 104 is operating at a specific frequency 130 and continuously transmits a beacon signal 132. The white space device 102 receives the beacon signal and transmits a non-interfering signal based on its receipt of the beacon signal 154. Thus, the wireless microphone system 104 is effectively protected from interference.

Figure 2:
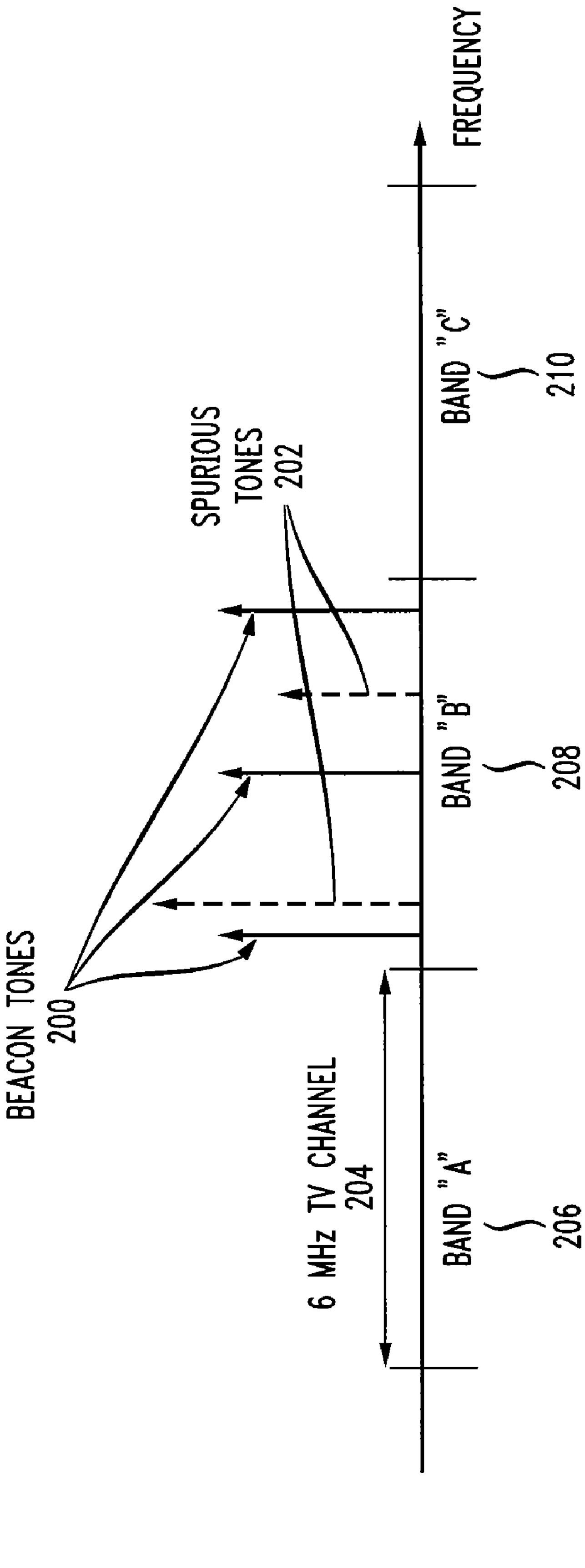
FIG. 2 is a diagram illustrating a 3-tone beacon signal.
Figure 3:
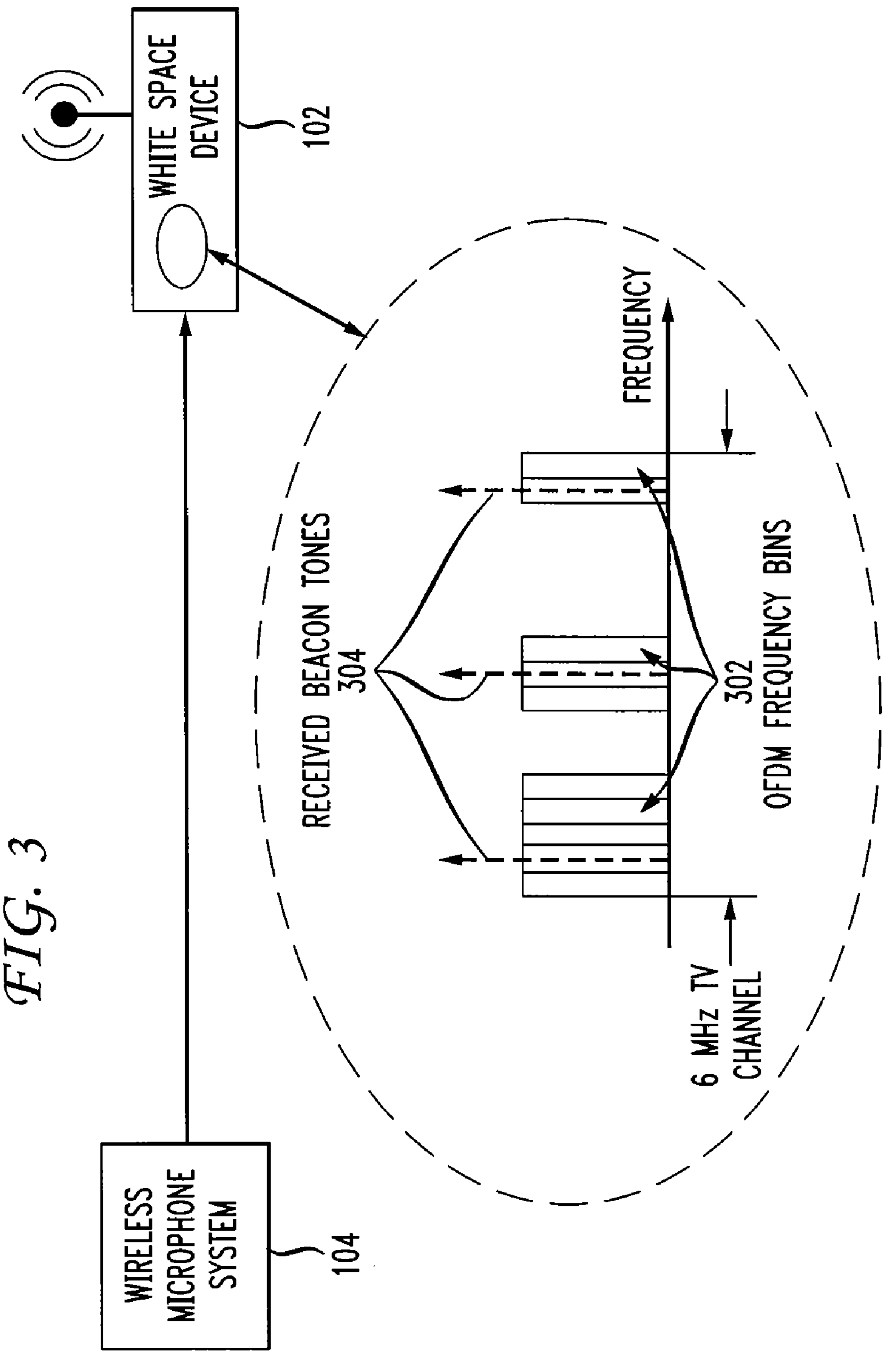
FIG. 3 is a diagram depicting a beacon detector.

In one embodiment of the technology, the wireless microphone system 104, with appropriate filtering, generates a beacon signal at a frequency that is located within an upper and lower bound of an operating channel frequency of the wireless microphone 105 being protected. The beacon signal may consist of two or more approximately pure continuous wave tones (sine waves) with specified spacing that could be located anywhere between a few kHz and a few MHz apart, but within the lower and upper bounds of the operating channel of the wireless microphone system 104. For example, FIG. 2 illustrates three 6 MHz TV channels 204. The three illustrated channels are referred to as band “A” 206, band “B” 208 and band “C” 210. The three beacon signals 200 are all located within band “B” 208, which represents a 6 MHz TV channel 204. A beacon using just a single tone would be unsatisfactory because a frequency channel, even if nominally unoccupied, is typically ‘polluted’ with one or more low-level tones caused by spurious emissions 202 from nearby electronic equipment. In such an environment, a white space user trying to detect a legitimate single-tone beacon would experience continual false alarms caused by these spurious tones 202 and would therefore be needlessly inhibited from transmitting his own signal. With two or more tones, as described herein, beacon signals 200 must be simultaneously detected in multiple frequency bins in order to recognize and detect an authentic beacon. Such tones are referred to as Orthogonal Frequency Division Multiplexing (OFDM) tones. Frequency bins are groups of different frequency ranges. FIG. 3 depicts a white space device 102 with multiple OFDM frequency bins 302 to receive and authenticate the beacon tones 304 that are sent by the wireless microphone system 104. Multiple beacon signals or tones 304 must be received by the OFDM frequency bins 302 in order for the white space device to determine that the multiple tones 304 constitute a beacon signal. Thus the chance of false alarm can be made extremely small. Non-orthogonal tones (i.e. simple Frequency Division Multiplexing (FDM) may be used instead of OFDM.

Figure 4A:
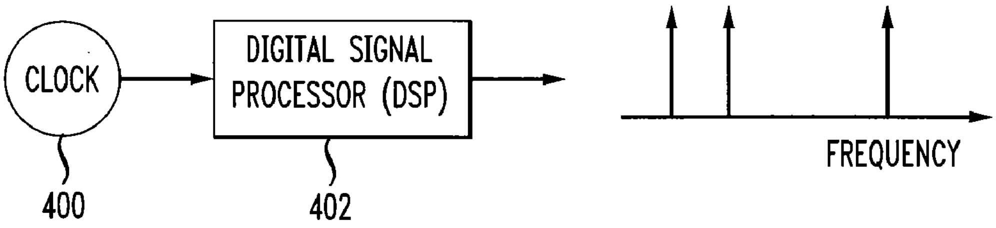
FIG. 4*a* is a diagram of a digital signal processor for generating a multi-tone beacon signal.
Figure 4B:
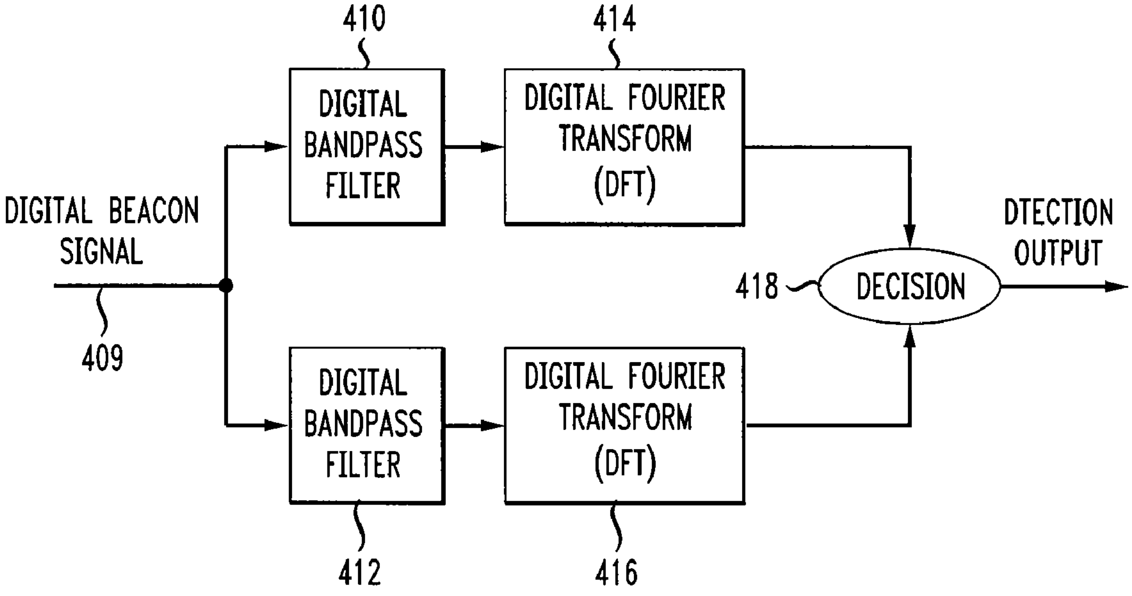
FIG. 4*b* is a diagram illustrating digital detection of a beacon signal.

Embodiments of the invention may be implemented through a variety of analog and/or digital techniques well known in the art. An advantageous embodiment using digital technology is shown in FIGS. 4*a* and 4*b*. FIG. 4*a* shows a clock 400 and Digital Signal Processor (DSP) 402 being used to generate the tones for the beacon signal. The DSP 402 allows any number of tones to be placed at whatever frequencies are desired. FIG. 4*b* shows digital bandpass filters 410 and 412, which may be implemented with DSP technology, to define frequency regions for each of the beacon tones (in this illustrated case, two tones) in order to detect the beacon tones. The filtered signals are then passed to one or more Digital Discrete Fourier Transform (DFT) circuits 414 and 416 for analysis and assignment into OFDM bins and subsequent decision 418 as to presence or absence of a beacon signal from the wireless microphone system. The use of multiple bandpass filters 410 and 412 allows widely spaced beacon tones to be used while simultaneously leaving most of the intervening frequency space available for use by wireless microphone signals. An example of beacon signals that are widely spaced apart is the frequency of a first beacon signal operating at the lower frequency limit of a frequency channel while the frequency of a second beacon signal operating at the upper frequency limit of the same channel. For example, the beacon signals may be spaced approximately 6 MHz apart from each other within a 6 MHz TV channel. If the frequencies of the beacon signals are sufficiently close together such that they are within the upper and lower frequency limit of a bandpass filter, then a single bandpass filter may be used to define a single contiguous frequency band that can pass all the tones. For example, if a bandpass filter is designed to pass frequencies within 20 KHz, then a single bandpass filter may be used if the frequencies of the beacon signals are within the 20 KHz range of the bandpass filter.

An embodiment of the disclosed technology provides the advantage of improved detection sensitivity. The multiple-tone 'signature' of the beacon allows the beacon detector in the white space device to discriminate against random spurious tones in the channel of interest. Moreover, the steady-state, continuous nature of the tones allows optimum integration of received beacon signal power, which in turn leads to maximum detection sensitivity.

Another advantage in accordance with the disclosed technology is the elimination of a requirement for synchronization between the wireless microphone system and the white space device. The steady-state nature of the beacon (i.e. continuous tones) means that the beacon detector can acquire the signal more rapidly than can any time-dependent approach, such as spread-spectrum or blinking. Moreover, the proposed multitone beacon signal is a natural fit to the OFDM technology likely to be used in white space devices. Finally, elimination of the synchronization requirement between the wireless microphone system and the white space device means that detector performance will not be interrupted in noisy environments by loss of synchronization.

Another advantage provided by the technology disclosed in this specification is an increased robustness against multipath fading. A radio wave may take multiple paths between the transmitter and the receiver. Alterations in the transmission path may change the phase relationship of the signal that travels along multiple paths, thereby causing destructive interference. The use of multiple beacon signals can protect against multipath fading because it is unlikely that the same level of destructive interference will occur in more than one beacon signal if the signals are widely spaced apart.

Embodiments of the present invention would be advantageous, for example, in equipment used for white space applications, including Wireless Regional Area Networks (WRANs) such as IEEE 802.22, as well as shorter-range Wireless Local Area Networks (WLANs). The beacon signal as described herein could be used in devices other than wireless microphones as well.

Figure 5:
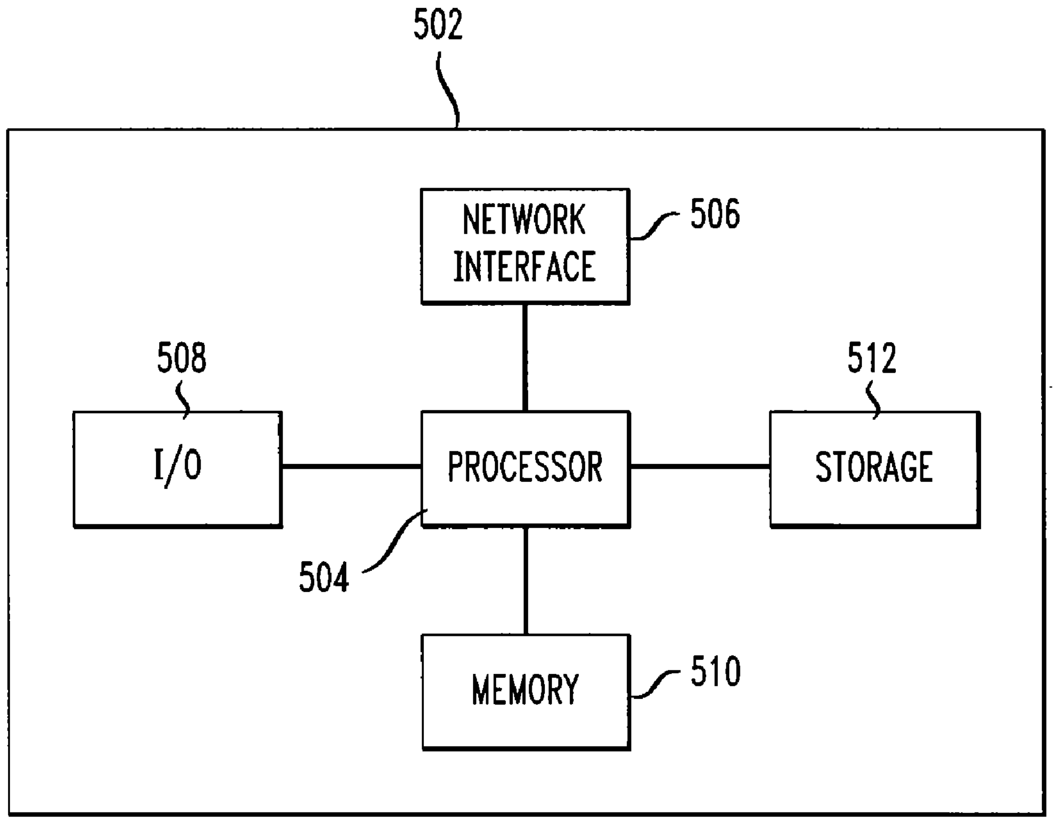
FIG. 5 is a high level block diagram of a computer.

The above-described methods and network elements may be implemented using one or more computers using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.), and loaded into memory 510 when execution of the computer program instructions is desired. Thus, the steps of, for example, FIGS. 1A and 1B can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm defined by the steps of FIGS. 1A and 1B. Accordingly, by executing the computer program instructions, the processor 504 executes an algorithm defined by the steps of FIGS. 1A and 1B. The computer 502 also includes one or more network interfaces 506 for communicating with other devices via a network. The computer 502 also includes other input/output devices 508 that enable user interaction with the computer 502. One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A wireless microphone system comprising:

a signal detector configured to detect signals that interfere with a first microphone frequency of a wireless microphone;

a beacon generator, configured to generate a plurality of beacon signals, each at a different frequency; and a transmitter configured to transmit the beacon signals upon the signal detector detecting signals that interfere with the first microphone frequency of the wireless microphone.

2. The wireless microphone system of claim 1, wherein the microphone system is configured to operate at a second microphone frequency if, at a time duration following transmission of the beacon signals, the signal detector detects signals that interfere with the first microphone frequency of the wireless microphone.

3. The wireless microphone system of claim 2 wherein the duration is less than one-tenth of a second.

4. The wireless microphone system of claim 2 wherein the beacon signals are generated at a frequency that is located within an upper and lower bound of an operating channel frequency of the wireless microphone.

5. The wireless microphone system of claim 1 wherein the spacing between beacon signals is between 2 Khz and 6 MHz.

6. The wireless microphone system of claim 1 wherein the signal detector, beacon generator and transmitter are enclosed within the structure of the wireless microphone.

7. The wireless microphone system of claim 1 wherein the signal detector, beacon generator and transmitter are enclosed within the structure of the wireless microphone receiver.

8. The wireless microphone system of claim 1 wherein the beacon signals are continuous tones.

9. The wireless microphone system of claim 1 wherein the beacon signal generator is a digital signal processor.

10. The wireless microphone system of claim 1 wherein a plurality of digital bandpass filters defines the frequency regions for the beacon signals.

11. A method for protecting a wireless microphone system from interference comprising:

detecting signals that interfere with a first microphone frequency of a wireless microphone;

generating a plurality of beacon signals, each at a different frequency; and transmitting the beacon signals upon detecting signals that interfere with the first microphone frequency of the wireless microphone.

12. The method of claim 11, further comprising:

Changing the microphone frequency to a second microphone frequency if, at a time duration following transmission of the beacon signals, the signal detector detects signals that interfere with the first microphone frequency of the wireless microphone.

13. The method of claim 12 wherein the duration is less than one-tenth of a second.

14. The method of claim 12 wherein the beacon signals are generated at a frequency that is located within an upper and lower bound of an operating channel frequency of the wireless microphone.

15. The method of claim 11 wherein the spacing between beacon signals is between 2 Khz and 6 MHz.

16. The method of claim 11 wherein the beacon signals are continuous tones.

17. The method of claim 11 wherein a plurality of digital bandpass filters defines the frequency regions for the beacon signals.

18. A computer readable medium encoded with computer executable instructions for protecting a wireless microphone system from interference, the computer executable instructions comprising:

detecting signals that interfere with a first microphone frequency of a wireless microphone;

generating a plurality of beacon signals, each at a different frequency; and transmitting the beacon signals upon detecting signals that interfere with the first microphone frequency of the wireless microphone.

19. The computer readable medium of claim 18, the computer executable instructions further comprising:

operating at a second microphone frequency if, at a time duration following transmission of the beacon signals, the signal detector detects signals that interfere with the first microphone frequency of the wireless microphone.

20. The computer readable medium of claim 19 wherein the duration is less than one-tenth of a second.

21. The computer readable medium of claim 19 wherein the beacon signals are generated at a frequency that is located within an upper and lower bound of an operating channel frequency of the wireless microphone.

22. The computer readable medium of claim 18 wherein the spacing between beacon signals is between 2 Khz and 6 MHz.

23. The computer readable medium of claim 18 wherein the beacon signals are continuous tones.

24. The computer readable medium of claim 18 wherein a plurality of digital bandpass filters defines the frequency regions for the beacon signals.

25. A white space device comprising:

a white beacon detector, configured to detect a plurality of beacon signals, each at a different frequency, said beacon signals indicating that a first operating frequency of the white space device interferes with a first microphone frequency of a wireless microphone; and a signal transmitter, configured to change the operating frequency of the white space device from a first operating frequency to a second operating frequency if the beacon detector detects a plurality of beacon signals indicating that the first operating frequency of the white space device interferes with the first microphone frequency of the wireless microphone.

26. A method for protecting a wireless microphone system from interference comprising:

detecting a plurality of beacon signals, each at a different frequency, said beacon signals indicating that a first operating frequency of a white space device interferes with a first microphone frequency of a wireless microphone; and changing the operating frequency of the white space device from the first operating frequency to a second operating frequency, based on detecting the plurality of beacon signals indicating that the first operating frequency of the white space device interferes with the first microphone frequency of the wireless microphone.

27. A computer readable medium encoded with computer executable instructions for protecting a wireless microphone system from interference, the computer executable instructions comprising:

detecting a plurality of beacon signals, each at a different frequency, said beacon signals indicating that a first operating frequency of a white space device interferes with a first microphone frequency of a wireless microphone; and changing the operating frequency of the white space device from the first operating frequency to a second operating frequency, based on detecting the plurality of beacon signals indicating that the first operating frequency of the white space device interferes with the first microphone frequency of the wireless microphone.

* * * * *